(12) United States Patent
Jiang et al.

(10) Patent No.: US 12,335,078 B2
(45) Date of Patent: Jun. 17, 2025

(54) UPLINK TRANSMISSION METHOD AND APPARATUS

(71) Applicant: FUJITSU LIMITED, Kawasaki (JP)

(72) Inventors: Qinyan Jiang, Beijing (CN); Tsuyoshi Shimomura, Yokohama (JP); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 373 days.

(21) Appl. No.: 17/880,800

(22) Filed: Aug. 4, 2022

(65) Prior Publication Data

US 2022/0385511 A1 Dec. 1, 2022

Related U.S. Application Data

(63) Continuation of application No. PCT/CN2020/075395, filed on Feb. 14, 2020.

(51) Int. Cl.
*H04L 27/26* (2006.01)
*H04W 16/14* (2009.01)
*H04W 74/00* (2009.01)
*H04W 74/0833* (2024.01)

(52) U.S. Cl.
CPC ......... *H04L 27/2607* (2013.01); *H04W 16/14* (2013.01); *H04W 74/006* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2018/0199381 A1 | 7/2018 | Rong et al. | |
| 2018/0227082 A1* | 8/2018 | Harada | H04L 1/187 |
| 2019/0208544 A1* | 7/2019 | Jia | H04W 74/0808 |
| 2020/0068599 A1* | 2/2020 | Yang | H04L 5/0055 |
| 2020/0313946 A1* | 10/2020 | Sun | H04L 27/26025 |
| 2021/0007129 A1* | 1/2021 | Talarico | H04W 72/1268 |
| 2021/0045163 A1 | 2/2021 | Chai et al. | |
| 2021/0345124 A1 | 11/2021 | Myung et al. | |
| 2022/0377813 A1* | 11/2022 | Wang | H04W 72/23 |

(Continued)

FOREIGN PATENT DOCUMENTS

| | | |
|---|---|---|
| CN | 105991499 A | 10/2016 |
| CN | 106507497 A | 3/2017 |
| CN | 108347318 A | 7/2018 |

(Continued)

OTHER PUBLICATIONS

Author Unknown, Channel access procedures, Doc. No. R1-1912709, pp. 1-10, Nov. 18, 2019.*

(Continued)

*Primary Examiner* — Christopher M Crutchfield
(74) *Attorney, Agent, or Firm* — Myers Wolin, LLC

(57) ABSTRACT

An uplink transmission method and apparatus. The method includes: calculating a length of cyclic prefix extension according to a length of symbols of a number of a predetermined value preceding a first symbol of uplink transmission, or calculating a length of cyclic prefix extension according to a predetermined value and a predefined symbol length, by a terminal equipment; and transmitting the cyclic prefix extension and the uplink transmission.

8 Claims, 6 Drawing Sheets

(56) References Cited

U.S. PATENT DOCUMENTS

2022/0400459 A1* 12/2022 Turtinen ............. H04W 56/001

FOREIGN PATENT DOCUMENTS

| CN | 110417521 A | 11/2019 |
|---|---|---|
| EP | 1 999 872 B1 | 8/2017 |
| WO | 2019/206318 A1 | 10/2019 |
| WO | 2020/030290 A1 | 2/2020 |
| WO | 2020/032697 A1 | 2/2020 |

OTHER PUBLICATIONS

Author Unknown, Channel access procedures for NR unlicensed, Doc. No. R1-1912938, pp. 1-15, Nov. 22, 2019.*

Author Unknown, Feature Lead's Summary #2 on Channel Access Procedures, Doc. No. R1-1911706, pp. 1-27, Oct. 20, 2019.*

Author Unknown, Coexistence and channel access for NR unlicensed band operations, Doc. No. R1-1911866, pp. 1-18, Oct. 20, 2019.*

International Search Report and Written Opinions of the International Searching Authority issued by the China National Intellectual Property Administration for corresponding International Patent Application No. PCT/CN2020/075395, mailed on Sep. 14, 2020, with an English translation.

Notice of Reasons for Refusal issued by the Japan Patent Office for corresponding Japanese Patent Application No. 2022-548570, mailed on Jul. 25, 2023, with an English translation.

LG Electronics, "Channel access procedure for NR-U", Agenda Item: 7.2.2.2.1, 3GPP TSG-RAN WG1 Meeting #98bis, R1-1910819, Chongqing, China, Oct. 14-20, 2019.

Qualcomm Incorporated, "Summary of RRC parameters for NR-U up to RAN1", Agenda Item: 7.2.2, 3GPP TSG-RAN WG1 Meeting #99, R1-1913566, Reno, USA, Nov. 18-22, 2019.

Ericsson, "Channel access procedures", Agenda Item: 7.2.2.2.1, 3GPP TSG-RAN WG1 Meeting #99, R1-1912709, Reno, USA, Nov. 18-22, 2019.

The Extended European search report with the Supplementary European search report and the European search opinion, issued by the European Patent Office for corresponding European Patent Application No. 20918562.8-1203, mailed on Jul. 25, 2023.

Partial Supplementary European Search Report issued by the European Patent Office for corresponding European Patent Application No. 20918562.8-1203, mailed on Feb. 22, 2023.

LG Electronics, "Channel access procedure for NR-U", Agenda Item: 7.2.2.2.1, 3GPP TSG-RAN WG1 Meeting #99, R1-1912389, Reno, USA, Nov. 18-22, 2019.

Ericsson, "Introduction of NR-based access to unlicensed spectrum" Change Request, 3GPP TSG-RAN WG1 Meeting #99, R1-1913630, Reno, NV, USA, Nov. 18-22, 2019.

Notice of Preliminary Rejection issued by the Korean Intellectual Property Office for corresponding Korean Patent Application No. 10-2022-7027817, mailed on Feb. 12, 2025, with an English translation.

First Notification of Office Action and Search Report issued by the China National Intellectual Property Administration for corresponding Chinese Patent Application No. 202080094184.6, mailed on Feb. 12, 2025, with an English translation.

Qualcomm Incorporated, Channel access procedures for NR unlicensed, Agenda item: 7.2.2.2.1 , 3GPP TSG RAN WG1 Meeting #99, R1-1912938, Reno, USA Nov. 18-Nov. 22, 2019, cited in CNOA.

Notice of Reasons for Refusal issued by the Japan Patent Office for corresponding Japanese Patent Application No. 2024-037306, mailed on Mar. 4, 2025, with an English translation.

* cited by examiner

UPLINK TRANSMISSION METHOD AND APPARATUS

CROSS-REFERENCE TO RELATED APPLICATION

This application is a continuation application of International Application PCT/CN2020/075395 filed on Feb. 14, 2020, and designated the U.S., the entire contents of which are incorporated herein by reference.

TECHNICAL FIELD

This disclosure relates to the field of communication technologies.

BACKGROUND

An unlicensed frequency band or shared spectrum is an important part of a spectrum resource. At present, many systems support data transmission in unlicensed frequency bands, such as WiFi, and Long Term Evolution (LTE) license assisted access (LAA), etc. However, a New Radio (NR, New Radio) system currently does not support unlicensed frequency bands.

On the other hand, a system deployed in an unlicensed frequency band needs to meet regulatory requirements of corresponding frequency bands in a region where it is located. For example, in order to use spectrum resources fairly and efficiently between different systems or devices, a device needs to acknowledge that a resource is available before starting to transmit data. For another example, if a device intends to share a channel occupied by another device in the system, an interval between two transmissions needs to be sufficiently small.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that currently, 3GPP is discussing how to support NR-U (NR radio access operation in unlicensed/shared spectrum). According to existing methods, a terminal equipment may need to transmit cyclic prefix (CP) extension before transmitting uplink transmission. However, in the current solution, the terminal equipment may not be able to correctly calculate a length of the CP extension, so that the uplink transmission cannot be correctly transmitted and received.

In order to solve at least one of the above problems, embodiments of this disclosure provide an uplink transmission method and apparatus, in which a terminal equipment is supported to calculate suitable CP extension, so that uplink transmission is able to be correctly transmitted and received.

According to an aspect of the embodiments of this disclosure, there is provided an uplink transmission method, including:

calculating a length of cyclic prefix extension by a terminal equipment according to a length of symbols of a number of a predetermined value preceding a first symbol of uplink transmission, or calculate a length of cyclic prefix extension according to a predetermined value and a predefined symbol length; and transmitting the cyclic prefix extension and the uplink transmission by the terminal equipment.

According to another aspect of the embodiments of this disclosure, there is provided an uplink transmission apparatus, including:

a processing unit configured to calculate a length of cyclic prefix extension according to a length of symbols of a number of a predetermined value preceding a first symbol of uplink transmission, or calculate a length of cyclic prefix extension according to a predetermined value and a predefined symbol length; and a transmitting unit configured to transmit the cyclic prefix extension and the uplink transmission.

According to a further aspect of the embodiments of this disclosure, there is provided an uplink transmission method, including:

transmitting a random access preamble by a terminal equipment to perform contention-based random access or contention-free random access; and receiving indication information transmitted by a network device, the indication information being used to indicate uplink transmission; wherein the indication information does not indicate the terminal equipment to transmit the uplink transmission according to a predetermined value, the predetermined value being used to calculate cyclic prefix extension.

According to still another aspect of the embodiments of this disclosure, there is provided an uplink transmission apparatus, including:

a transmitting unit configured to transmit a random access preamble to perform contention-based random access or contention-free random access; and a receiving unit configured to receive indication information transmitted by a network device, the indication information being used to indicate a terminal equipment to transmit uplink transmission; wherein the indication information does not indicate the terminal equipment to transmit the uplink transmission according to a predetermined value, the predetermined value being used to calculate cyclic prefix extension.

According to yet another aspect of the embodiments of this disclosure, there is provided an uplink transmission method, including:

receiving, by a terminal equipment, indication information used for indicating the terminal equipment to transmit uplink transmission, the indication information indicating the terminal equipment to transmit the uplink transmission according to a predetermined value, the predetermined value being used for calculating cyclic prefix extension; and in a case where the predetermined value is not configured or the configured predetermined value is inapplicable, calculating a length of the cyclic prefix extension according to a value of a predetermined value determined by timing advance or a predefined value of a predetermined value and transmitting the cyclic prefix extension and the uplink transmission, or not transmitting the uplink transmission.

According to yet still another aspect of the embodiments of this disclosure, there is provided an uplink transmission apparatus, including:

a receiving unit configured to receive indication information used for indicating a terminal equipment to transmit uplink transmission, the indication information indicating the terminal equipment to transmit the uplink transmission according to a predetermined value, the predetermined value being used for calculating cyclic prefix extension; and a processing unit configured to, in a case where the predetermined value is not configured or the configured predetermined value is inapplicable, calculate a length of the cyclic prefix extension according to a value of a predetermined value determined by timing advance or a predefined value of a predetermined value and transmit the cyclic prefix extension and the uplink transmission, or not transmit the uplink transmission.

An advantage of the embodiments of this disclosure exists in that the terminal equipment is supported to calculate suitable CP extension, so that the uplink transmission is able to be correctly transmitted and received.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
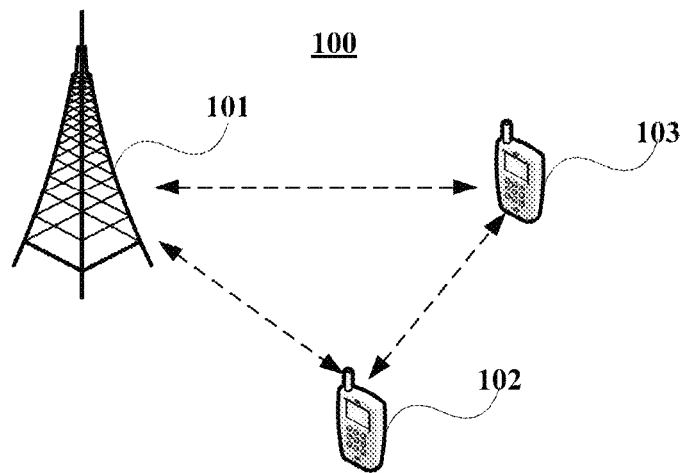
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. In this text, "a device" may refer to a network device, and may also refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

The NR_U may support more than two channel access modes, such as type 1, type 2A, type 2B, and type 2C, etc. For example, a network device may indicate CP extension to a terminal equipment via downlink control information (DCI).

As shown in Table 1, taking DCI format 0_0 and DCI format 1_0 as examples, when the network device indicates access type 2C by using index 0, the CP extension is calculated by C2*symbol length−16 us−TA; and when the network device indicates access type 2A by using index 1, the CP extension is calculated by C3*symbol length−25 us−TA; where, TA refers to timing advance.

TABLE 1

| Index | Channel access type | CP extension |
| --- | --- | --- |
| 0 | Type2C-ULChannelAccess defined in [subclause 4.2.1.2.3 in 37.213] | C2*symbol length − 16 us − TA |
| 1 | Type2A-ULChannelAccess defined in [subclause 4.2.1.2.1 in 37.213] | C3*symbol length − 25 us − TA |
| 2 | Type2A-ULChannelAccess defined in [subclause 4.2.1.2.1 in 37.213] | C1*symbol length − 25 us |
| 3 | Type1-ULChannelAccess defined in [subclause 4.2.1.1 in 37.213] | 0 |

Figure 2:
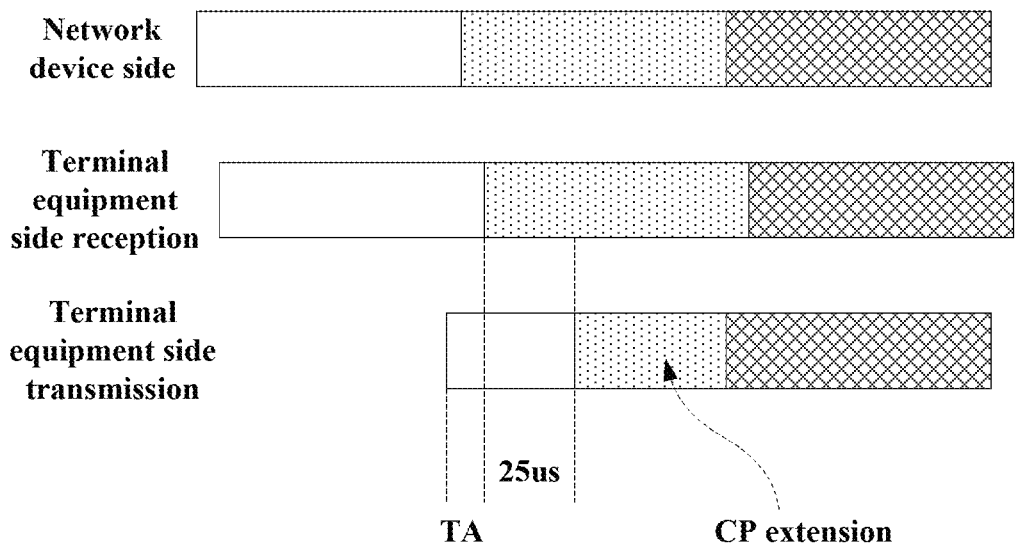
FIG. 2 is an exemplary diagram of CP extension in uplink transmission.

The terminal equipment performs uplink transmission according to the CP extension. FIG. 2 is an exemplary diagram of CP extension in uplink transmission. As shown in FIG. 2, the terminal equipment needs to obtain the CP extension correctly, so that the network device and the terminal equipment are able to correctly transmit and receive the uplink transmission.

In the following description, without causing confusion, terms "uplink control signal" and "uplink control information (UCI)" or "physical uplink control channel (PUCCH)" may be interchangeable, and terms "uplink data signal" and "uplink data information" or "physical uplink shared channel (PUSCH)" may be interchangeable.

Terms "downlink control signal" and "downlink control information (DCI,)" or "physical downlink control channel (PDCCH)" may be interchangeable, and terms "downlink data signal" and "downlink data information" or "physical downlink shared channel (PDSCH)" may be interchangeable.

In addition, transmitting or receiving a PUSCH may be understood as transmitting or receiving uplink data carried by a PUSCH, and transmitting or receiving a PUCCH may be understood as transmitting or receiving uplink information carried by a PUCCH. An uplink signal may include an uplink data signal and/or an uplink control signal, etc., which may also be referred to as UL transmission or uplink information or an uplink channel. Transmitting uplink transmission on an uplink resource may be understood as transmitting the uplink transmission by using the uplink resource.

In embodiments of this disclosure, higher-layer signaling may be, for example, radio resource control (RRC) signaling, such as being referred to as an RRC message, including, for example, an MIB, system information, and dedicated RRC message, or being referred to as an RRC IE (RRC information element). The higher-layer signaling may also be, for example, MAC (media access control) signaling, or may be referred to as an MAC IE (MAC information element). However, this disclosure is not limited thereto.

Embodiments of a First Aspect

For a subcarrier spacing μ, in a subframe, a time length of a symbol $l \in \{0,1,\ldots,N_{slot}^{subframe,\mu} N_{symb}^{slot}-1\}$ is, for example, expressed as:

$$T_{symb,l}^{\mu}=(N_u^{\mu}+N_{CP,l}^{\mu})T_c.$$

For example, according to the following formulae, $$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix}, l = 0 \text{ or } l = 7 \cdot 2^\mu \\ 144\kappa \cdot 2^{-\mu} & \text{normal cyclic prefix}, l \neq 0 \text{ and } l \neq 7 \cdot 2^\mu \end{cases}$$

where, for an NCP (normal cyclic prefix), as time lengths ($N_{CP,l}^\mu \cdot T_c$) of CPs of symbols at different time positions are different, time lengths of symbols at different time positions are also different. Specifically, according to the above formulae, time lengths of symbols of indices l=0 and l=7·2$^\mu$ are different from time lengths of symbols of indices l≠0 and l≠7·2$^\mu$. Reference may be made to related techniques for particular meanings of the symbols in the above formulae, which shall not be described herein any further.

According to the method shown in Table 1, for example, the time length of the CP extension is calculated according to "Cx*symbol length". However, as mentioned above, the time lengths of the symbols at different time positions are different. Therefore, if this method is adopted, for the terminal equipment, as symbol lengths are unable to be uniquely determined, and the terminal equipment is unable to uniquely determine the CP extension, thereby resulting in that the uplink transmission is unable to be transmitted correctly. On the other hand, for the network device, whether the terminal equipment may be indicated to use the channel access mode 2A or 2B or 2C may be limited by interval between adjacent transmissions. However, due to the above reasons, the network device is unable to uniquely determine the intervals between the adjacent transmissions, hence, it is unable to determine whether a corresponding channel access type may be used for the uplink transmission, thereby affecting scheduling of the uplink transmission.

Addressed to at least one of the above problems, the embodiments of this disclosure provide an uplink transmission method, which shall be described from a terminal equipment side.

Figure 3:
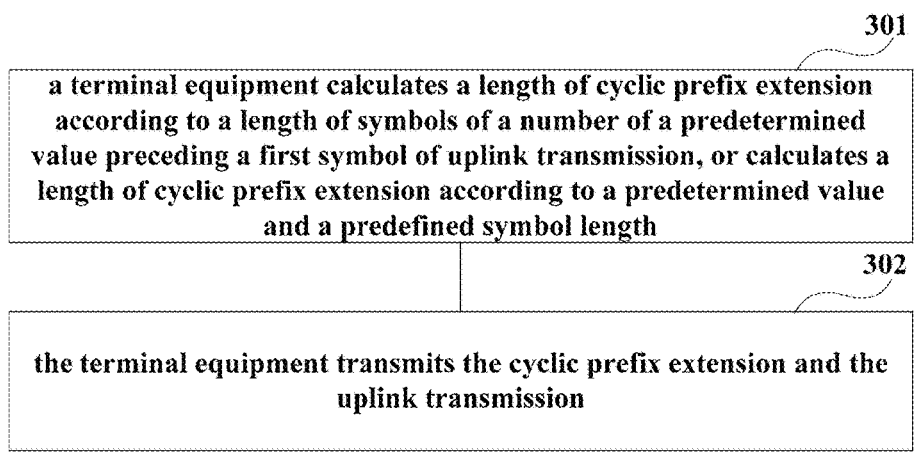
FIG. 3 is a schematic diagram of the uplink transmission method of an embodiment of this disclosure.

FIG. 3 is a schematic diagram of the uplink transmission method of the embodiment of this disclosure. As shown in FIG. 3, the method includes:

301: a terminal equipment calculates a length of cyclic prefix extension according to a length of symbols of a number of a predetermined value preceding a first symbol of uplink transmission, or calculates a length of cyclic prefix extension according to a predetermined value and a predefined symbol length; and

302: the terminal equipment transmits the cyclic prefix extension and the uplink transmission.

It should be noted that FIG. 3 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 3.

In some embodiments, the predetermined value (integer parameter) is predefined, or indicated by higher-layer signaling, or obtained by calculation. The predetermined value is C1 and/or C2 and/or C3. Reference may be made to related techniques for particular definitions of C1, C2, and C3.

For example, a value of C1 is predefined. For another example, values of C2 and C3 are configured (indicated) via dedicated RRC signaling of the terminal equipment, such as by using parameters CP-ExtensionC2-r16 and/or CP-ExtensionC3-r16. For example, for SCSs of 15 kHz and 30 kHz, value range(s) of C2/C3 is/are 1, 2, . . . , 28; and for an SCS of 60 kHz, value range(s) of C2/C3 is/are 2, 3, . . . , 28.

In some embodiments, the value of the predetermined value is obtained by calculation. For example, the terminal equipment calculates the value of the predetermined value according to timing advance (TA). Reference may be made to subsequent embodiments for how to calculate the value of the predetermined value (C1 and/or C2 and/or C3).

In some embodiments, the terminal equipment may calculate the cyclic prefix extension for the uplink transmission according to lengths of former symbols of a number of the predetermined value of the resource indicated by a time domain resource assignment (TDRA) indication field in the indication information.

For example, if the terminal equipment receives DCI format 0_0 including index 0, the terminal equipment may use C2 symbols before a first symbol of the resource indicated by the TDRA indication field in the DCI format 0_0, and calculate the CP extension according to lengths of the former C2 symbols.

For another example, if the terminal equipment receives DCI format 0_0 including index 1, the terminal equipment may use C3 symbols before a first symbol of the resource indicated by the TDRA indication field in the DCI format 0_0, and calculate the CP extension according to lengths of the former C3 symbols.

In some embodiments, the length of the cyclic prefix extension (CP extension) is calculated according to the lengths of the symbols of a number of the predetermined value before the first symbol of the uplink transmission.

For example, taking C2 as an example, the length $T_{ext}$ of the CP extension is calculated according to the following method:

$$T_{ext} = \sum_{l=mod(l_0-Cx, N_{slot}^{subframe,\mu} N_{symb}^{slot})}^{mod(l_0-1, N_{slot}^{subframe,\mu} N_{symb}^{slot})} T_{symb,l}^\mu - 16 \cdot 10^{-6} - T_{TA};$$

or, taking C3 as an example, $$T_{ext} = \sum_{l=mod(l_0-Cx, N_{slot}^{subframe,\mu} N_{symb}^{slot})}^{mod(l_0-1, N_{slot}^{subframe,\mu} N_{symb}^{slot})} T_{symb,l}^\mu - 25 \cdot 10^{-6} - T_{TA};$$

or, taking C1 as an example, $$T_{ext} = \sum_{l=mod(l_0-Cx, N_{slot}^{subframe,\mu} N_{symb}^{slot})}^{mod(l_0-1, N_{slot}^{subframe,\mu} N_{symb}^{slot})} T_{symb,l}^\mu - 25 \cdot 10^{-6};$$

where, Cx denotes the predetermined value, and $l_0$ denotes an index of the first symbol of the uplink transmission; and if m1 is a negative number and m2 is a positive number, mod(m1, m2) is calculated by truncating to negative infinity, for example, mod (−1, 14)=13.

For another example, taking C2 as an example, the length $T_{ext}$ of the CP extension is calculated according to the following method:

$$T_{ext} = \sum_{l=mod(i_0-Cx,N_{symb}^{slot})}^{mod(i_0-1,N_{symb}^{slot})} T_{symb,l}^\mu - 16 \cdot 10^{-6} - T_{TA};$$

or, taking C3 as an example, $$T_{ext} = \sum_{l=mod(i_0-Cx,N_{symb}^{slot})}^{mod(i_0-1,N_{symb}^{slot})} T_{symb,l}^\mu - 25 \cdot 10^{-6} - T_{TA};$$

or, taking C1 as an example, $$T_{ext} = \sum_{l=mod(i_0-Cx,N_{symb}^{slot})}^{mod(i_0-1,N_{symb}^{slot})} T_{symb,l}^\mu - 25 \cdot 10^{-6};$$

where, Cx denotes the predetermined value, and $l_0$ denotes an index of the first symbol of the uplink transmission; and if m1 is a negative number and m2 is a positive number, mod(m1, m2) is calculated by truncating to negative infinity, for example, mod (−1, 14)=13.

For a further example, taking C2 as an example, the length $T_{ext}$ of the CP extension is calculated according to the following method:

$$T_{ext} = \sum_{l=N_{slot}^{subframe,\mu} N_{symb}^{slot} + mod(i_0-Cx,N_{slot}^{subframe,\mu} N_{symb}^{slot})}^{N_{slot}^{subframe,\mu} N_{symb}^{slot} + mod(i_0-1,N_{slot}^{subframe,\mu} N_{symb}^{slot})} T_{symb,l}^\mu - 16 \cdot 10^{-6} - T_{TA};$$

or, taking C3 as an example, $$T_{ext} = \sum_{l=N_{slot}^{subframe,\mu} N_{symb}^{slot} + mod(i_0-Cx,N_{slot}^{subframe,\mu} N_{symb}^{slot})}^{N_{slot}^{subframe,\mu} N_{symb}^{slot} + mod(i_0-1,N_{slot}^{subframe,\mu} N_{symb}^{slot})} T_{symb,l}^\mu - 25 \cdot 10^{-6} - T_{TA};$$

or, taking C1 as an example, $$T_{ext} = \sum_{l=N_{slot}^{subframe,\mu} N_{symb}^{slot} + mod(i_0-Cx,N_{slot}^{subframe,\mu} N_{symb}^{slot})}^{N_{slot}^{subframe,\mu} N_{symb}^{slot} + mod(i_0-1,N_{slot}^{subframe,\mu} N_{symb}^{slot})} T_{symb,l}^\mu - 25 \cdot 10^{-6};$$

where, Cx denotes the predetermined value, and $l_0$ denotes an index of the first symbol of the uplink transmission; and if m1 is a negative number and m2 is a positive number, mod(m1, m2) is calculated by truncating to zero, for example, mod (−1, 14)=−1.

For still another example, taking C2 as an example, the length $T_{ext}$ of the CP extension is calculated according to the following method:

$$T_{ext} = \sum_{l=N_{symb}^{slot} + mod(i_0-Cx,N_{symb}^{slot})}^{N_{symb}^{slot} + mod(i_0-1,N_{symb}^{slot})} T_{symb,l}^\mu - 16 \cdot 10^{-6} - T_{TA};$$

or, taking C3 as an example, $$T_{ext} = \sum_{l=N_{symb}^{slot} + mod(i_0-Cx,N_{symb}^{slot})}^{N_{symb}^{slot} + mod(i_0-1,N_{symb}^{slot})} T_{symb,l}^\mu - 25 \cdot 10^{-6} - T_{TA};$$

or, taking C1 as an example, $$T_{ext} = \sum_{l=N_{symb}^{slot} + mod(i_0-Cx,N_{symb}^{slot})}^{N_{symb}^{slot} + mod(i_0-1,N_{symb}^{slot})} T_{symb,l}^\mu - 25 \cdot 10^{-6};$$

where, Cx denotes the predetermined value, and $l_0$ denotes an index of the first symbol of the uplink transmission; and if m1 is a negative number and m2 is a positive number, mod(m1, m2) is calculated by truncating to zero, for example, mod (−1, 14)=−1.

In some embodiments, the terminal equipment generates time domain continuous signals of the CP extension. The time-domain continuous signals may be transmitted together with the above uplink transmission, or may be transmitted separately.

In some embodiments, the terminal equipment receives indication information for indicating the terminal equipment to transmit uplink transmission, the indication information including a random access response (RAR) or downlink control information. The uplink transmission is a PUSCH or a PUCCH. The indication information includes an indication field for indicating a channel access type and CP extension, the indication field being referred to, for example, channel access type & CP extension.

For example, the indication information is DCI format 0_0, DCI format 0_1 or DCI format 0_2, which is used to indicate the terminal equipment to transmit a PUSCH (that is, the indication information corresponds to a PUSCH); for another example, the indication information is DCI format 1_0, DCI format 1_1 or DCI format 1_2, which is used to indicate the terminal equipment to transmit a PUCCH (that is, the indication information corresponds to a PUCCH), etc., and this disclosure is not limited thereto.

In some embodiments, the first symbol of the uplink transmission is a first symbol in the resource indicated by a time domain resource assignment (TDRA) indication field in the indication information; however, this disclosure is not limited thereto.

Table 2 shows an example of the embodiment of this disclosure, showing an indication field indicating a channel access type and CP extension (also applicable to an RAR) for DCI format 0_0 (corresponding to a PUSCH) and a channel access type and CP extension for DCI format 1_0 (corresponding to a PUCCH).

TABLE 2

| Bit field mapped to index | Channel Access Type | CP extension |
|---|---|---|
| 0 | Type2C-ULChannelAccess defined in [clause 4.2.1.2.3 in 37.213] | length of C2 symbols before the first symbol of a PUSCH/PUCCH - 16 us - TA |
| 1 | Type2A-ULChannelAccess defined in [clause 4.2.1.2.1 in 37.213] | length of C3 symbols before the first symbol of a PUSCH/PUCCH - 25 us - TA |
| 2 | Type2A-ULChannelAccess defined in [clause 4.2.1.2.1 in 37.213] | length of C1 symbols before the first symbol of a PUSCH/PUCCH - 25 us |
| 3 | Type1-ULChannelAccess defined in [clause 4.2.1.1 in 37.213] | 0 |

Table 3 shows an example of the embodiment of this disclosure, showing a case for DCI format 0_1 (corresponding to a PUSCH), which is used to indicate an index that is able to be indicated by an indication field of a channel access type and CP extension, and may be based on Table 3 and configured by, for example, a higher-layer parameter ULDCI-trigerred-UL-ChannelAccess-CPext-CAPC-List-r16.

TABLE 3

| Entry index | Channel Access Type | CP extension | CAPC |
|---|---|---|---|
| 0 | Type2C-ULChannelAccess defined in [clause 4.2.1.2.3 in 37.213] | 0 | 1 |
| 1 | Type2C-ULChannelAccess defined in [clause 4.2.1.2.3 in 37.213] | 0 | 2 |
| 2 | Type2C-ULChannelAccess defined in [clause 4.2.1.2.3 in 37.213] | 0 | 3 |
| 3 | Type2C-ULChannelAccess defined in [clause 4.2.1.2.3 in 37.213] | 0 | 4 |
| 4 | Type2C-ULChannelAccess defined in [clause 4.2.1.2.3 in 37.213] | length of C2 symbols before the first symbol of a PUSCH - 16 us - TA | 1 |
| 5 | Type2C-ULChannelAccess defined in [clause 4.2.1.2.3 in 37.213] | length of C2 symbols before the first symbol of a PUSCH - 16 us - TA | 2 |
| 6 | Type2C-ULChannelAccess defined in [clause 4.2.1.2.3 in 37.213] | length of C2 symbols before the first symbol of a PUSCH - 16 us - TA | 3 |
| 7 | Type2C-ULChannelAccess defined in [clause 4.2.1.2.3 in 37.213] | length of C2 symbols before the first symbol of a PUSCH - 16 us - TA | 4 |
| 8 | Type2B-ULChannelAccess defined in [clause 4.2.1.2.3 in 37.213] | 0 | 1 |
| 9 | Type2B-ULChannelAccess defined in [clause 4.2.1.2.3 in 37.213] | 0 | 2 |
| 10 | Type2B-ULChannelAccess defined in [clause 4.2.1.2.3 in 37.213] | 0 | 3 |
| 11 | Type2B-ULChannelAccess defined in [clause 4.2.1.2.3 in 37.213] | 0 | 4 |
| 12 | Type2B-ULChannelAccess defined in [clause 4.2.1.2.3 in 37.213] | length of C2 symbols before the first symbol of a PUSCH - 16 us - TA | 1 |
| 13 | Type2B-ULChannelAccess defined in [clause 4.2.1.2.3 in 37.213] | length of C2 symbols before the first symbol of a PUSCH - 16 us - TA | 2 |
| 14 | Type2B-ULChannelAccess defined in [clause 4.2.1.2.3 in 37.213] | length of C2 symbols before the first symbol of a PUSCH - 16 us - TA | 3 |
| 15 | Type2B-ULChannelAccess defined in [clause 4.2.1.2.3 in 37.213] | length of C2 symbols before the first symbol of a PUSCH - 16 us - TA | 4 |
| 16 | Type2A-ULChannelAccess defined in [clause 4.2.1.2.1 in 37.213] | 0 | 1 |
| 17 | Type2A-ULChannelAccess defined in [clause 4.2.1.2.1 in 37.213] | 0 | 2 |
| 18 | Type2A-ULChannelAccess defined in [clause 4.2.1.2.1 in 37.213] | 0 | 3 |
| 19 | Type2A-ULChannelAccess defined in [clause 4.2.1.2.1 in 37.213] | 0 | 4 |

TABLE 3-continued

| Entry index | Channel Access Type | CP extension | CAPC |
|---|---|---|---|
| 20 | Type2A-ULChannelAccess defined in [clause 4.2.1.2.1 in 37.213] | length of C1 symbols before the first symbol of a PUSCH - 25 us | 1 |
| 21 | Type2A-ULChannelAccess defined in [clause 4.2.1.2.1 in 37.213] | length of C1 symbols before the first symbol of a PUSCH - 25 us | 2 |
| 22 | Type2A-ULChannelAccess defined in [clause 4.2.1.2.1 in 37.213] | length of C1 symbols before the first symbol of a PUSCH - 25 us | 3 |
| 23 | Type2A-ULChannelAccess defined in [clause 4.2.1.2.1 in 37.213] | length of C1 symbols before the first symbol of a PUSCH - 25 us | 4 |
| 24 | Type2A-ULChannelAccess defined in [clause 4.2.1.2.1 in 37.213] | length of C3 symbols before the first symbol of a PUSCH - 25 us - TA | 1 |
| 25 | Type2A-ULChannelAccess defined in [clause 4.2.1.2.1 in 37.213] | length of C3 symbols before the first symbol of a PUSCH - 25 us - TA | 2 |
| 26 | Type2A-ULChannelAccess defined in [clause 4.2.1.2.1 in 37.213] | length of C3 symbols before the first symbol of a PUSCH - 25 us - TA | 3 |
| 27 | Type2A-ULChannelAccess defined in [clause 4.2.1.2.1 in 37.213] | length of C3 symbols before the first symbol of a PUSCH - 25 us - TA | 4 |
| 28 | Type1-ULChannelAccess defined in [clause 4.2.1.1 in 37.213] | 0 | 1 |
| 29 | Type1-ULChannelAccess defined in [clause 4.2.1.1 in 37.213] | 0 | 2 |
| 30 | Type1-ULChannelAccess defined in [clause 4.2.1.1 in 37.213] | 0 | 3 |
| 31 | Type1-ULChannelAccess defined in [clause 4.2.1.1 in 37.213] | 0 | 4 |
| 32 | Type1-ULChannelAccess defined in [clause 4.2.1.1 in 37.213] | length of C1 symbols before the first symbol of a PUSCH - 25 us | 1 |
| 33 | Type1-ULChannelAccess defined in [clause 4.2.1.1 in 37.213] | length of C1 symbols before the first symbol of a PUSCH - 25 us | 2 |
| 34 | Type1-ULChannelAccess defined in [clause 4.2.1.1 in 37.213] | length of C1 symbols before the first symbol of a PUSCH - 25 us | 3 |
| 35 | Type1-ULChannelAccess defined in [clause 4.2.1.1 in 37.213] | length of C1 symbols before the first symbol of a PUSCH - 25 us | 4 |
| 36 | Type1-ULChannelAccess defined in [clause 4.2.1.1 in 37.213] | length of C2 symbols before the first symbol of a PUSCH - 16 us - TA | 1 |
| 37 | Type1-ULChannelAccess defined in [clause 4.2.1.1 in 37.213] | length of C2 symbols before the first symbol of a PUSCH - 16 us- TA | 2 |
| 38 | Type1-ULChannelAccess defined in [clause 4.2.1.1 in 37.213] | length of C2 symbols before the first symbol of a PUSCH - 16 us - TA | 3 |
| 39 | Type1-ULChannelAccess defined in [clause 4.2.1.1 in 37.213] | length of C2 symbols before the first symbol of a PUSCH - 16 us - TA | 4 |
| 40 | Type1-ULChannelAccess defined in [clause 4.2.1.1 in 37.213] | length of C3 symbols before the first symbol of a PUSCH - 25 us - TA | 1 |
| 41 | Type1-ULChannelAccess defined in [clause 4.2.1.1 in 37.213] | length of C3 symbols before the first symbol of a PUSCH - 25 us - TA | 2 |
| 42 | Type1-ULChannelAccess defined in [clause 4.2.1.1 in 37.213] | length of C3 symbols before the first symbol of a PUSCH - 25 us - TA | 3 |
| 43 | Type1-ULChannelAccess defined in [clause 4.2.1.1 in 37.213] | length of C3 symbols before the first symbol of a PUSCH - 25 us - TA | 4 |

Table 4 shows another example of the embodiment of this disclosure, showing a case for DCI format 1_1 (corresponding to a PUCCH), which is used to indicate an index that is able to be indicated by an indication field of a channel access type and CP extension, and may be based on Table 4 and configured by, for example, a higher-layer parameter DLDCI-trigerred-UL-ChannelAccess-CPext-CAPC-List-r16.

TABLE 4

| Entry index | Channel Access Type | CP extension |
|---|---|---|
| 0 | Type2C-ULChannelAccess defined in [clause 4.2.1.2.3 in 37.213] | 0 |
| 1 | Type2C-ULChannelAccess defined in [clause 4.2.1.2.3 in 37.213] | length of C2 symbols before the first symbol of a PUCCH - 16 us - TA |
| 2 | Type2B-ULChannelAccess defined in [clause 4.2.1.2.3 in 37.213] | 0 |
| 3 | Type2B-ULChannelAccess defined in [clause 4.2.1.2.3 in 37.213] | length of C2 symbols before the first symbol of a PUCCH - 16 us - TA |
| 4 | Type2A-ULChannelAccess defined in [clause 4.2.1.2.1 in 37.213] | 0 |
| 5 | Type2A-ULChannelAccess defined in [clause 4.2.1.2.1 in 37.213] | length of C1 symbols before the first symbol of a PUCCH - 25 us |
| 6 | Type2A-ULChannelAccess defined in [clause 4.2.1.2.1 in 37.213] | length of C3 symbols before the first symbol of a PUCCH - 25 us - TA |
| 7 | Type1-ULChannelAccess defined in [clause 4.2.1.1 in 37.213] | 0 |
| 8 | Type1-ULChannelAccess defined in [clause 4.2.1.1 in 37.213] | length of C1 symbols before the first symbol of a PUCCH - 25 us |
| 9 | Type1-ULChannelAccess defined in [clause 4.2.1.1 in 37.213] | length of C2 symbols before the first symbol of a PUCCH - 16 us - TA |
| 10 | Type1-ULChannelAccess defined in [clause 4.2.1.1 in 37.213] | length of C3 symbols before the first symbol of a PUCCH - 25 us - TA |

In some embodiments, the terminal equipment may calculate the cyclic prefix extension for the uplink transmission based on the predetermined value and a predefined symbol length. For example, the predefined symbol length may be equal to a length of a first symbol or a length of a second symbol in a subframe or slot.

For example, the symbol length Lcp for calculating the CP extension is predefined, and if the terminal equipment is configured with C2 and receives DCI format 0_0 including index 0, the terminal equipment may calculate the CP extension according to C2 and Lcp.

For another example, the symbol length Lcp for calculating the CP extension is predefined, and if the terminal equipment is configured with C3 and receives DCI format 0_0 including index 1, the terminal equipment may calculate the CP extension according to C3 and Lcp.

In this way, the terminal equipment may uniquely determine the CP extension, so that the uplink transmission may be transmitted correctly.

In some embodiments, the predetermined value may be configured for a cell (cell), or may be configured for a timing advance group (TAG), or may also be configured for a bandwidth part (BWP).

In some embodiments, the predetermined values (C1/C2/C3) may be configured respectively for different subcarrier spacings (SCSs). And the terminal equipment may determine corresponding predetermined values (C1/C2/C3) according to an SCS of a UP BWP where the uplink transmission is located.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment may be supported to determine the resources used for uplink transmission, so that the uplink transmission may be transmitted and received correctly.

Embodiments of a Second Aspect

As described in the embodiments of the first aspect, the CP extension is calculated according to the predetermined value. In the current solution, the values of the predetermined values C2 and C3 may be configured for the terminal equipment, and the network device indicates the values of the predetermined values C2 and C3 of the terminal equipment via UE-specific RRC signaling (such as CP-ExtensionC2-r16, CP-ExtensionC3-r16).

That is, for different terminal equipments, the network device may indicate different values of the predetermined value C2 and/or values of the predetermined value C3, and for some terminal equipments, the network device may not indicate values of the predetermined value C2 and/or values of the predetermined value C3. Moreover, if the terminal equipments are in idle states or inactive states, in general, the network device is unable to indicate the values of the predetermined values C2 and C3 of the terminal equipment via the UE-specific RRC signaling.

As described above, the network device may possibly not indicate the values of the predetermined values C2 and C3 of the terminal equipment via the UE-specific RRC signaling, in which case if the network device indicates the terminal equipment to transmit the uplink transmission according to the predetermined value C2 or the predetermined value C3, as the terminal equipment does not learn a value of a corresponding predetermined value, the CP extension is unable to be calculated, so that the uplink transmission is unable to be correctly transmitted and received.

For example, in a contention-based random access (CBRA) procedure, a random access response (RAR) or a DCI format 0_0 scrambled by a temporary cell radio network temporary identifier (TC-RNTI) or DCI format 1_0 scrambled by the TC-RNTI is used to indicate the terminal equipment to transmit uplink transmission. For the terminal equipment, if the terminal equipment is in the idle or inactive state, and the network device indicates the terminal equipment to transmit the uplink transmission according to the predetermined value C2 or the predetermined value C3, as the terminal equipment does not learn a value of a corresponding predetermined value, it is unable to be calculate the CP extension, so that the uplink transmission is unable to be transmitted and received correctly.

For the network device, after receiving a preamble for contention-based random access (CBRA), the network device is unable to uniquely identify a terminal equipment transmitting the preamble, so it is also unable to determine whether it indicates values of the predetermined value C2 and/or the predetermined value C3 to the terminal equipment. And furthermore, even if it had already indicated the terminal equipment, the network device is unable to determine a particular value.

Therefore, if the network device indicates the terminal equipment to transmit the uplink transmission according to the predetermined value C2 or the predetermined value C3, the TDRA indicated thereby may possibly cause collision between adjacent transmissions, or does not satisfy a transmission requirement of the uplink transmission, or does not satisfy a requirement on an interval between adjacent transmissions.

Figure 4:
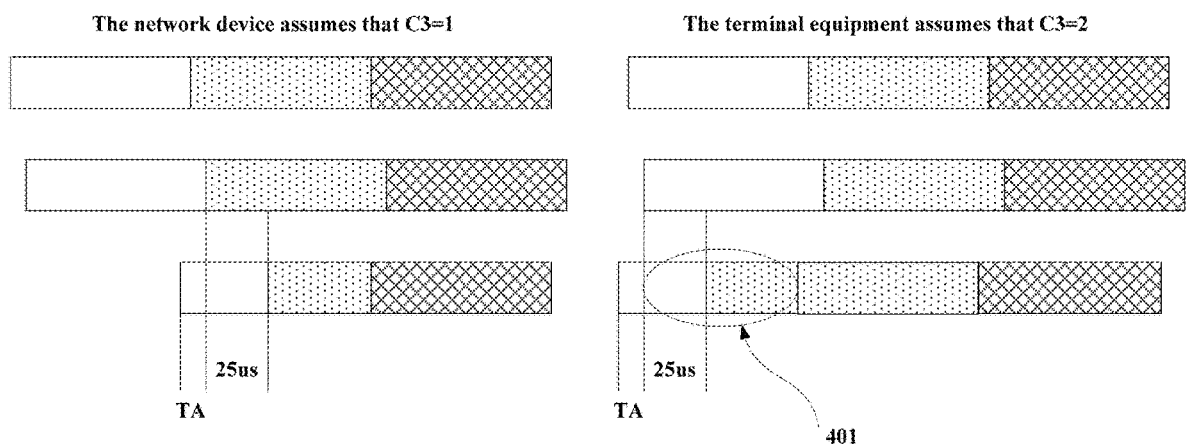
FIG. 4 is an exemplary diagram of causing uplink transmission collision of the embodiment of this disclosure.

FIG. 4 is an exemplary diagram of causing uplink transmission collision of the embodiment of this disclosure. As shown in FIG. 4, C3 assumed by the network device is 1 and C3 configured for the terminal equipment is 2, as shown by 401 in FIG. 4, an uplink transmission collision occurs.

Figure 5:
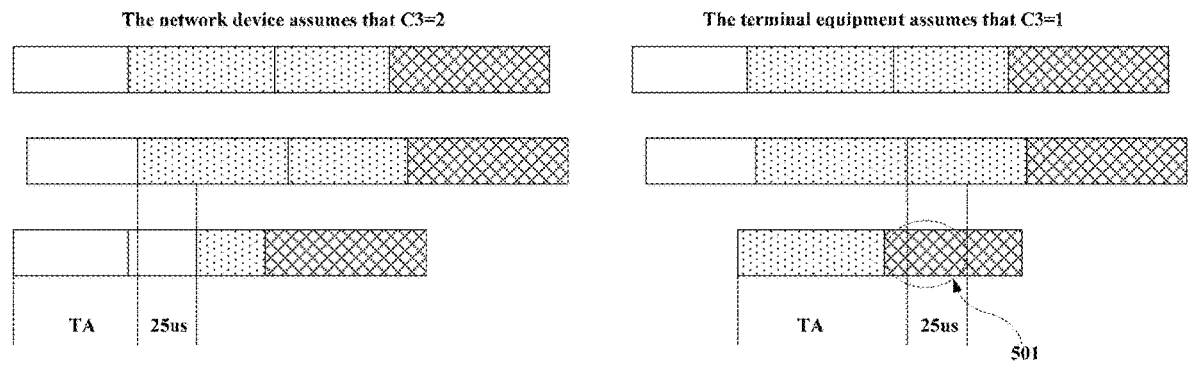
FIG. 5 is an exemplary diagram of not satisfying a requirement for transmission of uplink transmission of the embodiment of this disclosure.

FIG. 5 is an exemplary diagram of not satisfying a requirement for transmission of uplink transmission of the embodiment of this disclosure. As shown in FIG. 5, C3 assumed by the network device is 2 and C3 configured for the terminal equipment is 1, and TA+25 us is greater than a symbol length to which C3 corresponds. As shown by 501 in FIG. 5, the uplink transmission is unable to satisfy the transmission requirement.

Figure 6:
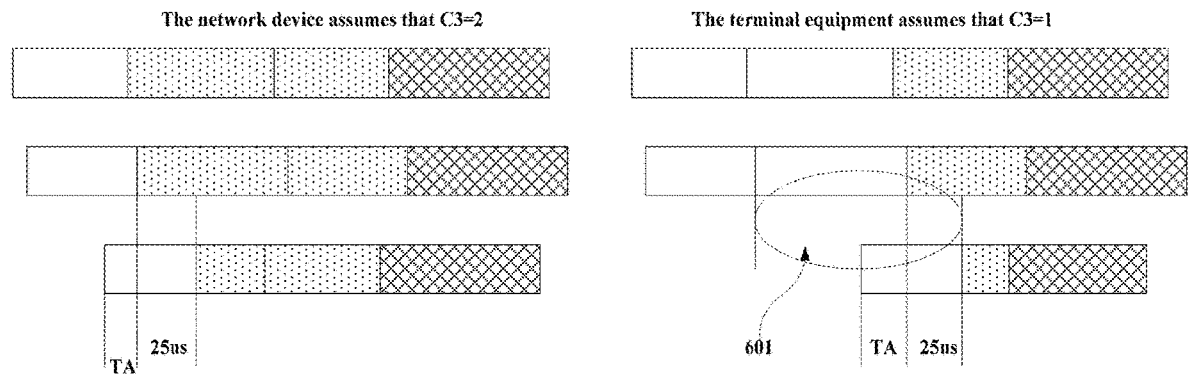
FIG. 6 is an exemplary diagram of not satisfying a requirement for an interval of uplink transmission of the embodiment of this disclosure.

FIG. 6 is an exemplary diagram of not satisfying a requirement for an interval of uplink transmission of the embodiment of this disclosure. As shown in FIG. 6, C3 assumed by the network device is 2 and C3 configured for the terminal equipment is 1, as shown by 601 in FIG. 6, the uplink transmission is unable to satisfy the interval requirement.

On the other hand, even if the network device indicates the values of the predetermined value C2 and/or the predetermined value C3 of the terminal equipment via UE-specific RRC signaling, as a position of the terminal equipment may possibly be changed, a TA value that should be adopted by it will also be correspondingly updated, and the indicated values of the predetermined value C2 and/or C3 may possibly not match with the TA value.

Addressed to at least one of the above problems, the embodiment of this disclosure provides an uplink transmission method, which shall be described from a terminal equipment side. The embodiments of this disclosure may be combined with the embodiments of the first aspect, or may be implemented independently, with contents identical to those in the embodiments of the first aspect being not going to be described herein any further.

Figure 7:
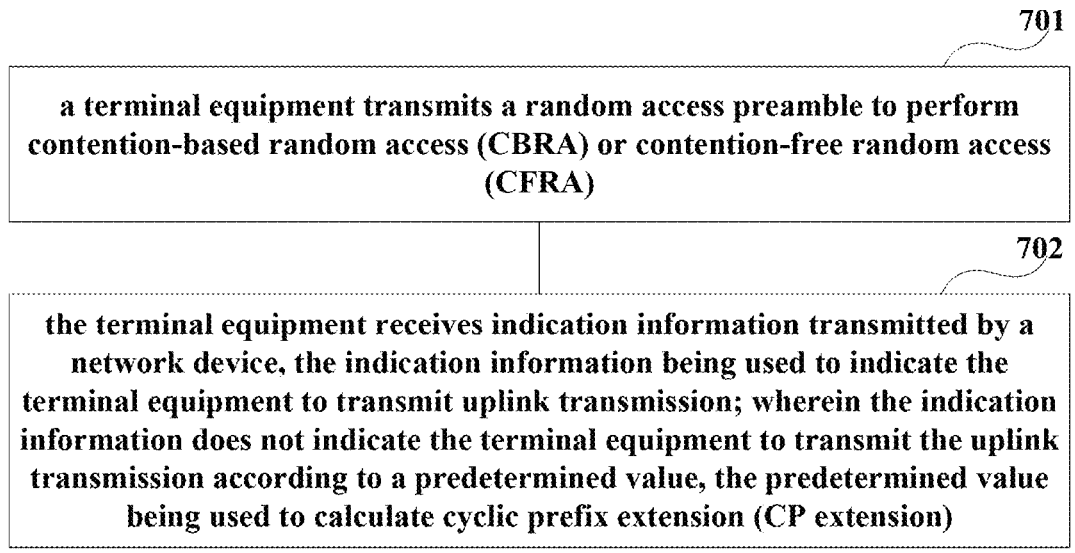
FIG. 7 is another schematic diagram of the uplink transmission method of the embodiment of this disclosure.

FIG. 7 is a schematic diagram of the uplink transmission method of the embodiment of this disclosure. As shown in FIG. 7, the method includes:

701: a terminal equipment transmits a random access preamble to perform contention-based random access (CBRA) or contention-free random access (CFRA); and

702: the terminal equipment receives indication information transmitted by a network device, the indication information being used to indicate the terminal equipment to transmit uplink transmission; wherein the indication information does not indicate the terminal equipment to transmit the uplink transmission according to a predetermined value, the predetermined value being used to calculate cyclic prefix extension (CP extension).

It should be noted that FIG. 7 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 7.

In some embodiments, the terminal equipment expects or determines that the indication information does not indicate the terminal equipment to transmit the uplink transmission according to the predetermined value.

In some embodiments, the predetermined value includes C1 and/or C2 and/or C3.

In some embodiments, the indication information includes: a random access response (RAR), or downlink control information having a downlink control information format 0_0 and scrambled by a TC-RNTI, or downlink control information having a downlink control information format 1_0 and scrambled by a TC-RNTI.

For example, for CBRA, the network device indicates the channel access type and CP extension based on Table 1 in the RAR, or in DCI format 0_0 scrambled by the TC-RNTI, or in DCI format 1_ 0 scrambled by the TC-RNTI, but it is unable to indicate index 0 and index 1 in Table 1.

For another example, for CBRA, the network device indicates the channel access type and CP extension based on Table 1 in the RAR, or in DCI format 0_0 scrambled by the TC-RNTI, or in DCI format 1_0 scrambled by the TC-RNTI, but it is only able to indicate index 3 in Table 1.

In some embodiments, the indication information is downlink control information having a downlink control information format 0_0 or 1_0, and the indication information indicates the channel access type and CP extension in different manners when different RNTI types are used for scrambling. And the terminal equipment needs to determine the channel access type and CP extension indicated by the indication information according to an RNTI type used by the indication information.

For example, if the indication information is scrambled by the TC-RNTI, the indication information indicates the channel access type and CP extension based on, for example, Table 5 below. If a C-RNTI or CS-RNTI or MCS-C-RNTI is used for scrambling, the channel access type and CP extension are indicated based on Table 1, for example.

For another example, if the indication information is scrambled by the TC-RNTI, the terminal equipment ignores the indication field used to indicate the channel access type and CP extension in the indication information, and transmits the uplink transmission by using a channel access type 0, CP extension=0. If a C-RNTI or CS-RNTI or MCS-C-RNTI is used for scrambling, the channel access type and CP extension are indicated based on Table 1, for example.

TABLE 5

| Bit field mapped to index | Channel Access Type | CP extension |
|---|---|---|
| 0 | Type2A-ULChannelAccess defined in [clause 4.2.1.2.1 in 37.213] | length of C1 symbols before the first symbol of a PUSCH - 25 us |
| 1 | Type1-ULChannelAccess defined in [clause 4.2.1.1 in 37.213] | 0 |

For another example, for CFRA, in CFRA used for acquiring (such as handover, Scell addition) or updating TA to which a new cell (TAG) corresponds (such as in PDCCH triggered), it is also possible that values of C2/C3 are not configured, or configured values of C2/C3 do not match with a TA value indicated in the RAR, in which case the indication information do not indicate the terminal equipment to transmit the uplink transmission according to the predetermined value.

In some embodiments, the terminal equipment is not configured with a value of the predetermined value, or a configured predetermined value is not applicable. Reference may be made to subsequent embodiments for specific contents that are not applicable.

In some embodiments, the terminal equipment removes the configured predetermined value when timing advance is unmatched with the configured predetermined value.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

Thus, by restricting the configuration of the network device, it is possible to avoid indicating the terminal equipment to perform uplink transmission by using C2/C3, so that the uplink transmission may be correctly transmitted and received.

Embodiments of a Third Aspect

The embodiments of this disclosure provide an uplink transmission method, which shall be described from a terminal equipment. Reference may be made to the embodiments of the second aspect for problems to be solved by the embodiments of this disclosure. The embodiments of this disclosure may be combined with the embodiments of the first and second aspects, or may be implemented independently, with contents identical to those in the embodiments of the first and second aspects being not going to be described herein any further.

Figure 8:
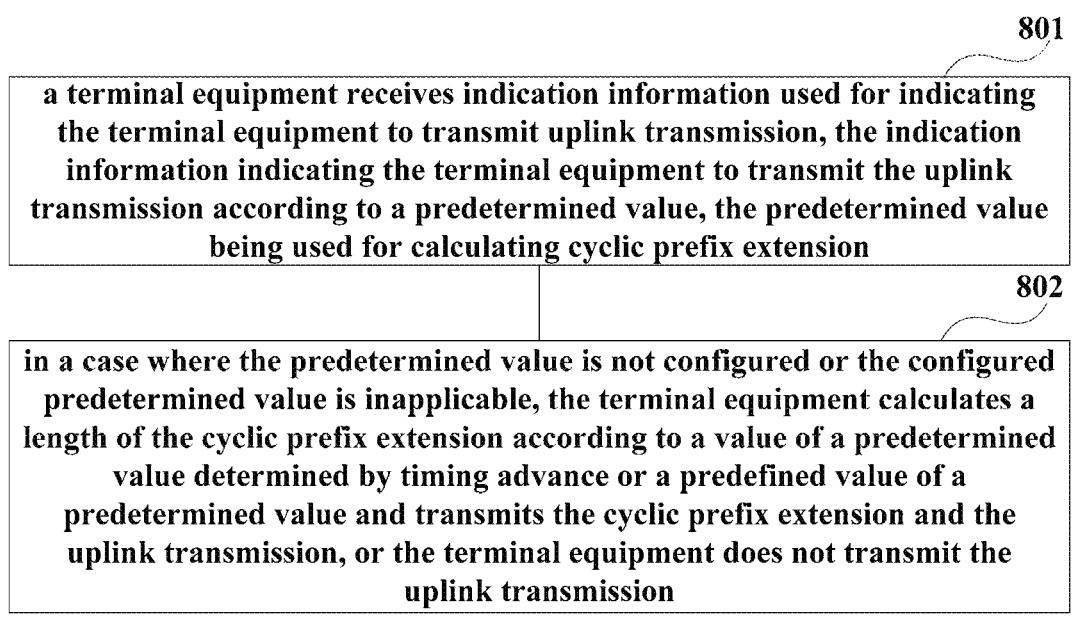
FIG. 8 is a further schematic diagram of the uplink transmission method of the embodiment of this disclosure.

FIG. 8 is another schematic diagram of the uplink transmission method of the embodiment of this disclosure. As shown in FIG. 8, the method includes:

801: a terminal equipment receives indication information used for indicating the terminal equipment to transmit uplink transmission, the indication information indicating the terminal equipment to transmit the uplink transmission according to a predetermined value, the predetermined value being used for calculating cyclic prefix extension; and

802: in a case where the predetermined value is not configured or the configured predetermined value is inapplicable, the terminal equipment calculates a length of the cyclic prefix extension according to a value of a predetermined value determined by timing advance or a predefined value of a predetermined value and transmits the cyclic prefix extension and the uplink transmission, or the terminal equipment does not transmit the uplink transmission.

It should be noted that FIG. 8 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 8.

In some embodiments, the predetermined value is C2 or C3, and reference may be made to the preceding embodiments for C2/C3.

In some embodiments, the terminal equipment receives first higher-layer signaling, the first higher-layer signaling being used to indicate a value of the predetermined value, and the first higher-layer signaling being UE-specific.

For example, if the terminal equipment has not received the first higher-layer signaling (that is, the terminal equipment is not configured with the values of C2/C3), or the values of C2/C3 configured (or indicated) by the first high-layer signaling is inapplicable, the terminal equipment calculates the cyclic prefix extension for the uplink transmission by using the values of the predetermined value C2/C3 determined by the timing advance, and transmits the uplink transmission.

For another example, if the terminal equipment has not received the first higher-layer signaling (that is, the terminal equipment is not configured with the values of C2/C3), or the values of C2/C3 configured by the first higher-layer signaling is inapplicable, the terminal equipment calculates the cyclic prefix extension for the uplink transmission according to the predefined C2/C3, and transmits the uplink transmission.

For a further example, if the terminal equipment has not received the first higher-layer signaling (that is, the terminal equipment is not configured with the values of C2/C3), or the values of C2/C3 configured by the first higher-layer signaling is inapplicable, the terminal equipment does not transmit the uplink transmission.

In some embodiments, the terminal equipment receives second higher-layer signaling, the second higher-layer signaling being used to indicate the value of the predetermined value, and the second higher-layer signaling being cell-specific. That is, it is common to users in a cell, such as being transmitted in system information.

In some embodiments, the terminal equipment calculates the cyclic prefix extension according to the value of the predetermined value indicated by the second higher-layer signaling.

For example, if the terminal equipment has not received the first higher-layer signaling (that is, the terminal equipment is not configured with the values of C2/C3), or the values of C2/C3 configured by the first higher-layer signaling is inapplicable, the terminal equipment calculates the cyclic prefix extension for the uplink transmission according to C2/C3 configured by the second higher-layer signaling, and transmits the uplink transmission.

For another example, if the terminal equipment receives the first higher-layer signaling and the second higher-layer signaling, in the CBRA procedure, the terminal equipment calculates the cyclic prefix extension according to the value of the predetermined value indicated by the second higher-layer signaling.

In some embodiments, if the uplink transmission is uplink transmission in the CBRA procedure (such as msg.3), the value(s) of the predetermined value configured by the first higher-layer signaling and/or the second higher-layer signaling is/are inapplicable.

For example, if the uplink transmission is the uplink transmission in the CBRA procedure (such as msg.3), the terminal equipment calculates the cycle prefix extension for the uplink transmission by using the values of the predetermined value C2/C3 determined by the timing advance, and transmits the uplink transmission.

For another example, if the uplink transmission is the uplink transmission in the CBRA procedure (such as msg.3), the terminal equipment calculates the cyclic prefix extension for the uplink transmission according to the predefined C2/C3, and transmits the uplink transmission.

In some embodiments, that the predetermined value is inapplicable includes: the timing advance being unmatched with a predetermined value configured by the first higher-layer signaling and/or a predetermined value configured by second higher-layer signaling.

In some embodiments, the indication information includes: a random access response (RAR) or downlink control information, and reference may be made to the preceding embodiments for particular contents thereof.

In some embodiments, the timing advance being unmatched with a predetermined value includes:
16 us+TA>C2*a length of a symbol, and/or
C2*a length of a symbol−16 us−TA>a length of a symbol;
where, C2 is the predetermined value, and TA is the timing advance.

In some embodiments, the timing advance being unmatched with a predetermined value includes:
25 us+TA>C3*a length of a symbol, and/or
C3*a length of a symbol−25 us−TA>a length of a symbol;
where, C3 is the predetermined value, and TA is the timing advance.

In some embodiments, the terminal equipment adopts the values of the predetermined value C2/C3 determined by the timing advance, and the determined values should make a length of the CP extension greater than or equal to 0, and/or the length of the CP extension less than a length of a symbol.

The cases where the predetermined value is inapplicable and the timing advance does not match the predetermined value are only schematically illustrated above; however, this disclosure is not limited thereto. For example, when TA adjustment is indicated by a TimingAdvanceCommand MAC CE, an adjusted TA value may possibly not match with previously configured C2/C3, and so on.

In some embodiments, the terminal equipment transmits a random access preamble to perform contention-based random access (CBRA) or contention-free random access (CFRA).

In some embodiments, the timing advance is TA indicated in the random access response, wherein the network device may calculate the TA according to the preamble, and indicate the TA to the terminal equipment in the RAR. Reference may be to related techniques for how the network device calculates and indicates the TA.

In some embodiments, the indication information is a random access response, and the timing advance is timing advance indicated in the indication information.

In some embodiments, the indication information is downlink control information having downlink control information format 0_0 and scrambled by using a TC-RNTI, and the timing advance is the timing advance indicated in the random access response to which the indication information corresponds. For example, in the same CBRA process, the RAR is an RAR transmitted before the downlink control information having downlink control information format 0_0 and scrambled by using the TC-RNTI.

In some embodiments, the indication information is a random access response or downlink control information, and the timing advance may also be a TA maintained by the terminal equipment. For example, if the terminal equipment is in a connected state and a TA timer is running, the terminal equipment may use the maintained TA.

In some embodiments, the terminal equipment removes the configured predetermined value when the timing advance is unmatched with the configured predetermined value.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment may be supported to determine the resources used for uplink transmission, so that the uplink transmission may be transmitted and received correctly.

Embodiments of a Fourth Aspect

The embodiments of this disclosure provide an uplink transmission apparatus. The apparatus may be, for example, a terminal equipment, or may be one or more components or assemblies configured in a terminal equipment. Contents in the embodiments identical to those in the embodiments of the first to the third aspects shall not be described herein any further.

Figure 9:
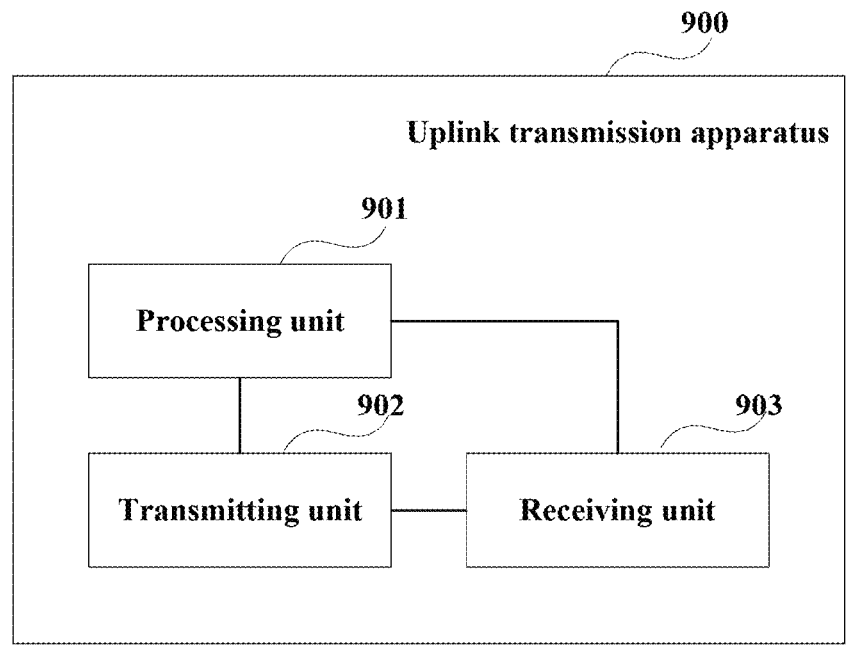
FIG. 9 is a schematic diagram of the uplink transmission apparatus of an embodiment of this disclosure.

FIG. 9 is a schematic diagram of the uplink transmission apparatus of the embodiment of this disclosure. As shown in FIG. 9, the uplink transmission apparatus 900 includes:
a processing unit 901 configured to calculate a length of cyclic prefix extension according to a length of symbols of a number of a predetermined value preceding a first symbol of uplink transmission, or calculate a length of cyclic prefix extension according to a predetermined value and a predefined symbol length; and
a transmitting unit 902 configured to transmit the cyclic prefix extension and the uplink transmission.

In some embodiments, as shown in FIG. 9, the apparatus further includes:
a receiving unit 903 configured to receive indication information used for indicating a terminal equipment to transmit uplink transmission; wherein the indication information includes a random access response or downlink control information.

In some embodiments, the first symbol of the uplink transmission is a first symbol in resources indicated by a time domain resource assignment indication field in the indication information.

In some embodiments, the predetermined value is configured for a cell, or is configured for a timing advance group, or is configured for a bandwidth part.

In some embodiments, the predetermined value is configured respectively for different subcarrier spacings.

In some embodiments, the transmitting unit 902 transmits a random access preamble to perform contention-based random access or contention-free random access;

and the receiving unit 903 receives indication information transmitted by the network device, the indication information being used to indicate the terminal equipment to transmit uplink transmission; wherein the indication information does not indicate the terminal equipment to transmit the uplink transmission according to the predetermined value, the predetermined value being used to calculate cyclic prefix extension.

In some embodiments, the terminal equipment expects or determines that the indication information does not indicate the terminal equipment to transmit the uplink transmission according to the predetermined value.

In some embodiments, the terminal equipment is not configured with the predetermined value, or the configured predetermined value is inapplicable.

In some embodiments, the processing unit 901 removes the configured predetermined value when timing advance is unmatched with the configured predetermined value.

In some embodiments, the predetermined value includes C1 and/or C2 and/or C3. In some embodiments, the indication information includes: a random access response, or downlink control information having a downlink control information format 0_0, or downlink control information having a downlink control information format 1_0.

In some embodiments, the receiving unit 903 receives the indication information for indicating the terminal equipment to transmit the uplink transmission, the indication information indicating the terminal equipment to transmit the uplink transmission according to the predetermined value, and the predetermined value being used to calculate the cyclic prefix extension;

and when the predetermined value is not configured or the configured predetermined value is not applicable, the processing unit 901 calculates a length of the cyclic prefix extension according to the value of the predetermined value determined by the timing advance or a predefined value of the predetermined value, and transmits the cyclic prefix extension and the uplink transmission, or does not transmit the uplink transmission.

In some embodiments, the receiving unit 903 is further configured to: receive first higher-layer signaling, the first higher-layer signaling being used to indicate the value of the predetermined value, and the first higher-layer signaling being UE specific.

In some embodiments, the receiving unit 903 is further configured to: receive second higher-layer signaling, the second higher-layer signaling being used to indicate the value of the predetermined value, and the second higher-layer signaling being cell specific.

In some embodiments, that the predetermined value is inapplicable includes: the timing advance being unmatched with a predetermined value configured by the first higher-layer signaling and/or a predetermined value configured by second higher-layer signaling.

In some embodiments, that the timing advance being unmatched with a predetermined value includes:
16 us+TA>C2*a length of a symbol, and/or
C2*a length of a symbol−16 us−TA>a length of a symbol;
where, C2 is the predetermined value, and TA is the timing advance.

In some embodiments, the that the timing advance being unmatched with a predetermined value includes:
25 us+TA>C3*a length of a symbol, and/or
C3*a length of a symbol−25 us−TA>a length of a symbol;
where, C3 is the predetermined value, and TA is the timing advance.

In some embodiments, the transmitting unit 902 transmits a random access preamble to perform contention-based random access or contention-free random access.

In some embodiments, the timing advance is timing advance indicated in a random access response.

In some embodiments, the indication information is the random access response, and the timing advance is timing advance indicated in the indication information, or the indication information is downlink control information having a downlink control information format 0_0 and scrambled by using a TC-RNTI, and the timing advance is timing advance indicated in the random access response to which the indication information corresponds.

In some embodiments, the indication information is a random access response or downlink control information, and the timing advance is timing advance maintained by the terminal equipment.

It should be noted that the components or modules related to this disclosure are only described above. However, this disclosure is not limited thereto, and the uplink transmission apparatus 900 may further include other components or modules, and reference may be made to related techniques for particulars of these components or modules.

Furthermore, for the sake of simplicity, connection relationships between the components or modules or signal profiles thereof are only illustrated in FIG. 9. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment may be supported to determine the resources used for uplink transmission, so that the uplink transmission may be transmitted and received correctly.

Embodiments of a Fifth Aspect

The embodiments of this disclosure provide a communication system, and reference may be made to FIG. 1, with contents identical to those in the embodiments of the first to the fourth aspects being not going to be described herein any further.

In some embodiments, the communication system 100 may include:
a terminal equipment 102 including the uplink transmission apparatus 900 described in the embodiment of the fourth aspect.

The embodiment of this disclosure further provides a network device, which may be, for example, a base station. However, this disclosure is not limited thereto, and it may also be another network device.

Figure 10:
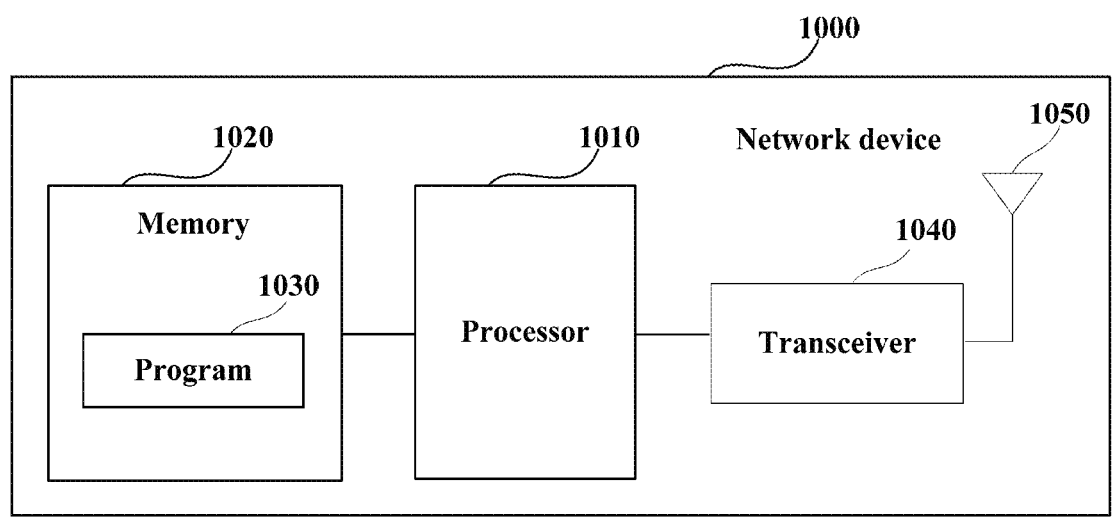
FIG. 10 is a schematic diagram of the network device of an embodiment of this disclosure.

FIG. 10 is a schematic diagram of the network device of the embodiment of this disclosure. As shown in FIG. 10, the network device 1000 may include a processor 1010 (such as a central processing unit (CPU)) and a memory 1020, the memory 1020 being coupled to the processor 1010. Wherein, the memory 1020 may store various data, and furthermore, it may store a program 1030 for data processing, and execute the program 1030 under control of the processor 1010.

For example, the processor 1010 may be configured to execute the program to carry out the uplink transmission method as described in the embodiments of the first to third aspects. For example, the processor 1010 may be configured to execute the following control: transmitting configuration information and/or indication information to the terminal equipment.

Furthermore, as shown in FIG. 10, the network device 1000 may include a transceiver 1040, and an antenna 1050, etc. Functions of the above components are similar to those in the relevant art, and shall not be described herein any further. It should be noted that the network device 1000 does not necessarily include all the parts shown in FIG. 10, and furthermore, the network device 1000 may include parts not shown in FIG. 10, and the relevant art may be referred to.

The embodiment of this disclosure further provides a terminal equipment; however, this disclosure is not limited thereto, and it may also be another equipment.

Figure 11:
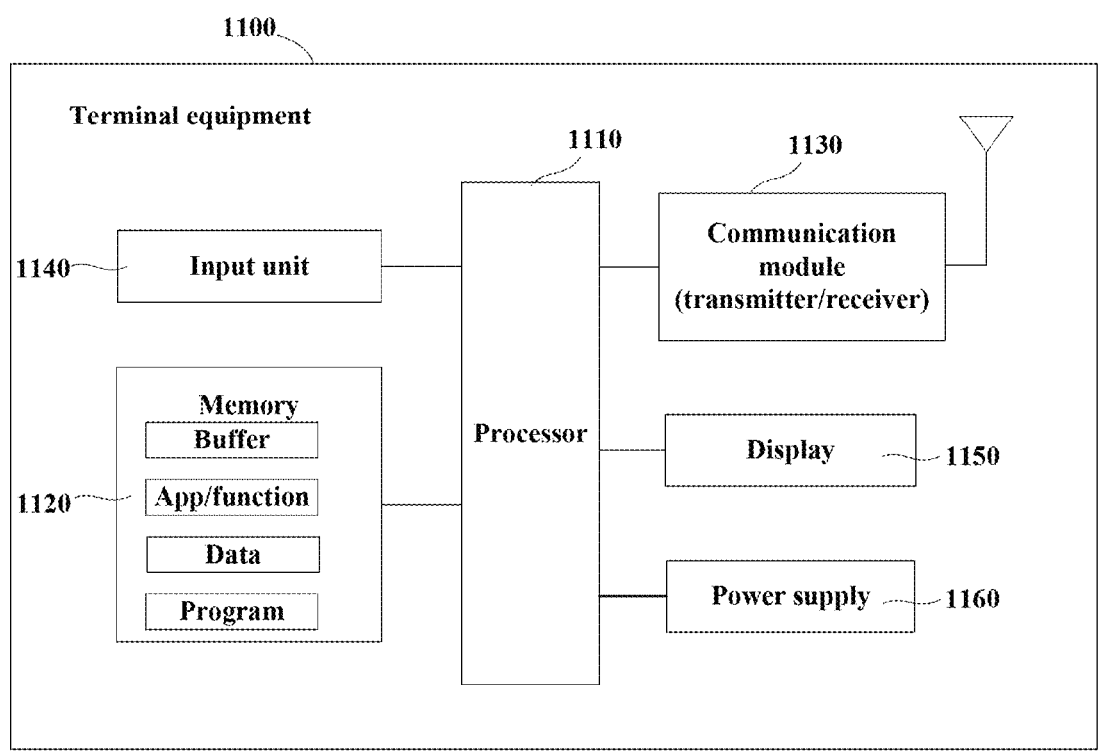
FIG. 11 is a schematic diagram of the terminal equipment of an embodiment of this disclosure.

FIG. 11 is a schematic diagram of the terminal equipment of the embodiment of this disclosure. As shown in FIG. 11, the terminal equipment 1100 may include a processor 1110 and a memory 1120, the memory 1120 storing data and a program and being coupled to the processor 1110. It should be noted that this figure is illustrative only, and other types of structures may also be used, so as to supplement or replace this structure and achieve a telecommunications function or other functions.

For example, the processor 1110 may be configured to execute a program to carry out the uplink transmission method as described in the embodiment of the first aspect. For example, the processor 1110 may be configured to perform the following control: calculating a length of cyclic prefix extension according to a length of symbols of a number of a predetermined value preceding a first symbol of uplink transmission, or calculating a length of cyclic prefix extension according to a predetermined value and a predefined symbol length; and transmitting the cyclic prefix extension and the uplink transmission.

For another example, the processor 1110 may be configured to execute a program to carry out the uplink transmission method as described in the embodiment of the second aspect. For example, the processor 1110 may be configured to perform the following control: transmitting a random access preamble to perform contention-based random access (CBRA) or contention-free random access (CFRA); and receiving indication information transmitted by a network device, the indication information being used to indicate the terminal equipment to transmit uplink transmission; wherein the indication information does not indicate the terminal equipment to transmit the uplink transmission according to a predetermined value, the predetermined value being used to calculate cyclic prefix extension (CP extension).

For example, the processor 1110 may be configured to execute a program to carry out the uplink transmission method as described in the embodiment of the third aspect. For example, the processor 1110 may be configured to perform the following control: receiving indication information used for indicating the terminal equipment to transmit uplink transmission, the indication information indicating the terminal equipment to transmit the uplink transmission according to a predetermined value, the predetermined value being used for calculating cyclic prefix extension; and in a case where the predetermined value is not configured or the configured predetermined value is inapplicable, calculating a length of the cyclic prefix extension according to a value of a predetermined value determined by timing advance or a predefined value of a predetermined value and transmitting the cyclic prefix extension and the uplink transmission, or not transmitting the uplink transmission.

As shown in FIG. 11, the terminal equipment 1100 may further include a communication module 1130, an input unit 1140, a display 1150, and a power supply 1160; wherein functions of the above components are similar to those in the relevant art, which shall not be described herein any further. It should be noted that the terminal equipment 1100 does not necessarily include all the parts shown in FIG. 11, and the above components are not necessary. Furthermore, the terminal equipment 1100 may include parts not shown in FIG. 11, and the relevant art may be referred to.

An embodiment of this disclosure provides a computer program, which, when executed in a terminal equipment, will cause the terminal equipment to carry out the uplink transmission method as described in the embodiments of the first to the third aspects.

An embodiment of this disclosure provides a storage medium, including a computer program, which, when executed in a terminal equipment, will cause the terminal equipment to carry out the uplink transmission method as described in the embodiments of the first to the third aspects The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

As to implementations containing the above embodiments, following supplements are further disclosed.

Supplement 1. An uplink transmission method, including:
calculating a length of cyclic prefix extension according to a length of symbols of a number of a predetermined value preceding a first symbol of uplink transmission, or calculating a length of cyclic prefix extension according to a predetermined value and a predefined symbol length; and
transmitting the cyclic prefix extension and the uplink transmission.

Supplement 2. The method according to supplement 1, wherein the uplink transmission is a PUSCH.

Supplement 3. The method according to supplement 1 or 2, wherein the uplink transmission is a PUCCH.

Supplement 4. The method according to any one of supplements 1-3, wherein the terminal equipment generates time-domain continuous signals of the CP extension.

Supplement 5. The method according to any one of supplements 1-4, wherein the predefined symbol length is equal to a length of a first symbol or a length of a second symbol in a subframe or slot.

Supplement 6. The method according to any one of supplements 1-5, wherein the method further includes:
receiving indication information used for indicating a terminal equipment to transmit uplink transmission by the terminal equipment; wherein the indication information includes a random access response (RAR) or downlink control information.

Supplement 7. The method according supplement 7, wherein the first symbol of the uplink transmission is a first symbol in resources indicated by a TDRA indication field in the indication information.

Supplement 8. The method according to any one of supplements 1-7, wherein the predetermined value is predefined, or indicated by higher-layer signaling, or obtained through calculation.

Supplement 9. The method according to any one of supplements 1-8, wherein the predetermined value is C1, or C2, or C3.

Supplement 10. The method according to supplement 8, wherein the terminal equipment calculates the predetermined value according to TA.

Supplement 11. The method according to any one of supplements 1-10, wherein the predetermined value is configured for a cell, or configured for a timing advance group (TAG), or configured for a bandwidth part (BWP).

Supplement 12. The method according to supplement 11, wherein the predetermined value is respectively configured for different subcarrier spacings (SCS).

Supplement 13. An uplink transmission method, including:
transmitting a random access preamble by a terminal equipment to perform contention-based random access (CBRA) or contention-free random access (CFRA); and
receiving indication information transmitted by a network device, the indication information being used to indicate a terminal equipment to transmit uplink transmission; wherein the indication information does not indicate the terminal equipment to transmit the uplink transmission according to a predetermined value, the predetermined value being used to calculate cyclic prefix extension.

Supplement 14. The method according to supplement 13, wherein the terminal equipment expects or determines that the indication information does not indicate the terminal equipment to transmit the uplink transmission according to the predetermined value.

Supplement 15. The method according to supplement 13, wherein the terminal equipment is not configured with the predetermined value, or the configured predetermined value is inapplicable.

Supplement 16. The method according to any one of supplements 13-15, wherein the method further includes:
removing the configured predetermined value by the terminal equipment when timing advance is unmatched with the configured predetermined value.

Supplement 17. The method according to any one of supplements 13-16, wherein the predetermined value includes C1 and/or C2 and/or C3.

Supplement 18. The method according to any one of supplements 13-17, wherein the indication information includes: a random access response (RAR), or downlink control information having a downlink control information format 0_0, or downlink control information having a downlink control information format 1_0.

Supplement 19. The method according to supplement 18, wherein the indication information is downlink control information having downlink control information format 0_0, and the indication information indicates the channel access type and CP extension based on the following table:

| Bit field mapped to index | Channel Access Type | CP extension |
|---|---|---|
| 0 | Type2A-ULChannelAccess defined in [clause 4.2.1.2.1 in 37.213] | length of C1 symbols before the first symbol of a PUSCH - 25 us |
| 1 | Type1-ULChannelAccess defined in [clause 4.2.1.1 in 37.213] | 0 |

Supplement 20. An uplink transmission method, including:
receiving, by a terminal equipment, indication information used for indicating the terminal equipment to transmit uplink transmission, the indication information indicating the terminal equipment to transmit the uplink transmission according to a predetermined value, the predetermined value being used for calculating cyclic prefix extension; and
in a case where the predetermined value is not configured or the configured predetermined value is inapplicable, calculating a length of the cyclic prefix extension according to a value of a predetermined value determined by timing advance or a predefined value of a predetermined value and transmitting the cyclic prefix extension and the uplink transmission, or not transmitting the uplink transmission.

Supplement 21. The method according to supplement 18, wherein the predetermined value is C2 or C3.

Supplement 22. The method according to supplement 20 or 21, wherein the method further includes:
receiving first higher-layer signaling by the terminal equipment, the first higher-layer signaling being used to indicate a value of the predetermined value and being UE specific.

Supplement 23. The method according to any one of supplements 20-22, wherein the method further includes:
receiving second higher-layer signaling by the terminal equipment, the second higher-layer signaling being used to indicate a value of the predetermined value and being cell specific.

Supplement 24. The method according to supplement 23, wherein in a CBRA procedure, the terminal equipment calculates the cyclic prefix extension according to the value of the predetermined value indicated by the second higher-layer signaling.

Supplement 25. The method according to any one of supplements 20-24, wherein that the predetermined value is inapplicable includes: the timing advance being unmatched with a predetermined value configured by first higher-layer signaling and/or a predetermined value configured by second higher-layer signaling.

Supplement 26. The method according to any one of supplements 20-25, wherein the indication information includes: a random access response (RAR) or downlink control information.

Supplement 27. The method according to supplement 25, wherein that the timing advance being unmatched with a predetermined value includes:
16 us+TA>C2*a length of a symbol, and/or
C2*a length of a symbol−16 us−TA>a length of a symbol;
where, C2 is the predetermined value, and TA is the timing advance.

Supplement 28. The method according to supplement 25, wherein that the timing advance being unmatched with a predetermined value includes:
25 us+TA>C3*a length of a symbol, and/or
C3*a length of a symbol−25 us−TA>a length of a symbol;
where, C3 is the predetermined value, and TA is the timing advance.

Supplement 29. The method according to any one of supplements 20-28, wherein the method further includes:
transmitting a random access preamble by the terminal equipment to perform contention-based random access (CBRA) or contention-free random access (CFRA)

Supplement 30. The method according to supplement 29, wherein the timing advance is timing advance indicated in a random access response.

Supplement 31. The method according to supplement 30, wherein the indication information is the random access response, and the timing advance is timing advance indicated in the indication information, or
the indication information is downlink control information having a downlink control information format 0_0 and scrambled by using a TC-RNTI, and the timing advance is timing advance indicated in the random access response to which the indication information corresponds.

Supplement 32. The method according to any one of supplements 20-29, wherein the indication information is a random access response or downlink control information, and the timing advance is timing advance maintained by the terminal equipment.

Supplement 33. An uplink transmission method, wherein the method includes:
removing a configured predetermined value by a terminal equipment when timing advance is not matched with the configured predetermined value.

Supplement 34. An uplink transmission method, wherein the method includes:
receiving first higher-layer signaling by a terminal equipment, the first higher-layer signaling being used to indicate a value of a predetermined value, and the first higher-layer signaling being UE-specific; and
receiving second higher-layer signaling by a terminal equipment, the second higher-layer signaling being used to indicate the value of the predetermined value, and the second higher-layer signaling being cell-specific.

Supplement 35. A terminal equipment, including a memory and a processor, the memory storing a computer program, and the processor being configured to execute the computer program to carry out the uplink transmission method as described in any one of supplements 1-34.

Supplement 36. A communication system, including the terminal equipment as described in supplement 35.

What is claimed is:
1. An uplink transmission apparatus, comprising:
a receiver configured to receive indication information used for indicating a terminal equipment to transmit an uplink transmission, the indication information indicating the terminal equipment to transmit the uplink transmission according to an integer parameter, the integer parameter being used for calculating a duration of cyclic prefix extension preceding a first symbol of the uplink transmission; and processor circuitry configured to, in a case where a value of the integer parameter is not configured or the uplink transmission is for contention-based random access (CBRA), calculate the duration of the cyclic prefix extension according to the value of the integer parameter determined according to timing advance and transmit the cyclic prefix extension and the uplink transmission.

2. The apparatus according to claim 1, wherein the integer parameter is C2, or C3;
the indication information comprises: random access response (RAR), or downlink control information.

3. The apparatus according to claim 1, wherein a determined value of the integer parameter makes the duration of the cyclic prefix extension larger than or equal to 0, and/or, shorter than a duration of one symbol preceding the first symbol of the uplink transmission.

4. The apparatus according to claim 1, wherein the receiver is further configured to receive first higher-layer signaling, the first higher-layer signaling being used to indicate a value of the integer parameter and being UE specific.

5. The apparatus according to claim 1, wherein the timing advance is timing advance indicated in a random access response.

6. The apparatus according to claim 5, wherein the indication information is the random access response, and the timing advance is timing advance indicated in the indication information, or the indication information is downlink control information having a downlink control information format 0_0 and scrambled by using a TC-RNTI, and the timing advance is timing advance indicated in the random access response to which the indication information corresponds.

7. The apparatus according to claim 1, wherein the indication information is a random access response or downlink control information, and the timing advance is timing advance maintained by the terminal equipment.

8. An apparatus for receiving uplink transmission, comprising:

a transmitter configured to transmit indication information used for indicating a terminal equipment to transmit an uplink transmission, the indication information indicating the terminal equipment to transmit the uplink transmission according to an integer parameter, the integer parameter being used for calculating a duration of cyclic prefix extension preceding a first symbol of the uplink transmission; and a receiver configured to receive the cyclic prefix extension and the uplink transmission;

wherein, in a case where a value of the integer parameter is not configured or the uplink transmission is for contention-based random access (CBRA), the duration of the cyclic prefix extension is calculated by the terminal equipment according to the value of the integer parameter determined according to timing advance.

* * * * *